United States Patent [19]

Bentsen

[11] Patent Number: 4,673,383

[45] Date of Patent: Jun. 16, 1987

[54] FUSIBLE RIB BONDING OF FASTENERS TO SUBSTRATE

[75] Inventor: Per Bentsen, Suffern, N.Y.

[73] Assignee: Minigrip, Incorporated, Orangeburg, N.Y.

[21] Appl. No.: 797,147

[22] Filed: Nov. 12, 1985

[51] Int. Cl.$^4$ ............................................ B31B 23/90
[52] U.S. Cl. .................................. 493/381; 493/213; 493/193; 156/66; 156/244.15; 156/244.25; 242/1; 242/55; 242/DIG. 2
[58] Field of Search ............. 156/244.15, 291, 244.25, 156/290, 295, 66; 242/1, 55, 103, DIG. 2; 493/390, 213, 214, 394, 381, 193

[56] References Cited

U.S. PATENT DOCUMENTS

| | | | |
|---|---|---|---|
| Re. 26,991 | 7/1964 | Luca | 264/95 |
| 2,054,448 | 9/1936 | Russell | 156/291 |
| 2,666,466 | 1/1954 | Sharat | 156/244.15 |
| 3,278,959 | 10/1966 | Nardone | 156/244.15 |
| 3,381,592 | 5/1968 | Ravel | 493/214 |
| 3,783,074 | 1/1974 | Normanton | 156/291 |
| 4,115,178 | 9/1978 | Cone et al. | 156/291 |
| 4,225,095 | 9/1980 | Jureit et al. | 242/1 |
| 4,279,677 | 7/1981 | Takahashi | 156/160 |
| 4,354,541 | 10/1982 | Tilman | 150/3 |
| 4,355,494 | 10/1982 | Tilman | 53/416 |
| 4,419,159 | 12/1983 | Herrington | 156/66 |
| 4,430,070 | 2/1984 | Ausnit | 493/215 |
| 4,477,036 | 10/1984 | Rundo | 242/67.2 |

Primary Examiner—Frederick R. Schmidt
Assistant Examiner—William E. Terrell
Attorney, Agent, or Firm—Hill, Van Santen, Steadman & Simpson

[57] ABSTRACT

A plastic separable fastener strip, and assembly of such strip with a substrate, and a method of attaching such strip to a substrate, comprising the provision of and utilization of fusible ribs on the base surface of the fastener strip to provide a bonding layer for bonding the strip to the substrate. Reducing the ribs into fusible condition without heat distortion of the remainder of the fastener strip and without heat distortion or damage of the substrate, provides a bonding layer when the fused ribs of the fastener strip are pressed together with the substrate. A simple apparatus and method are provided for effecting the bonding by fusion of the fusion ribs.

12 Claims, 8 Drawing Figures

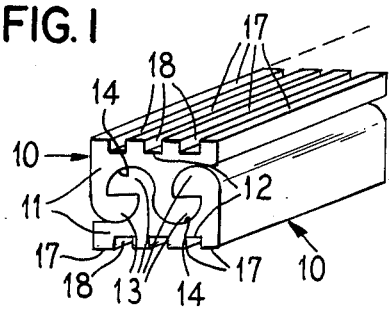
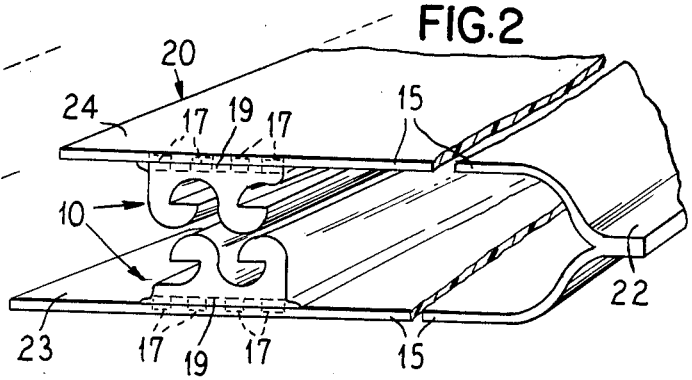
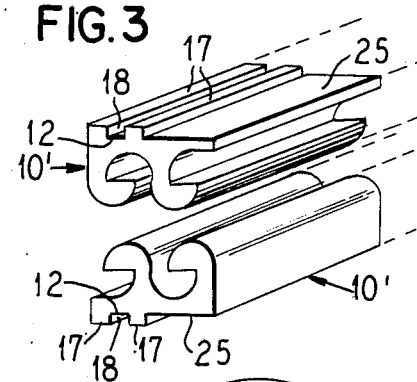
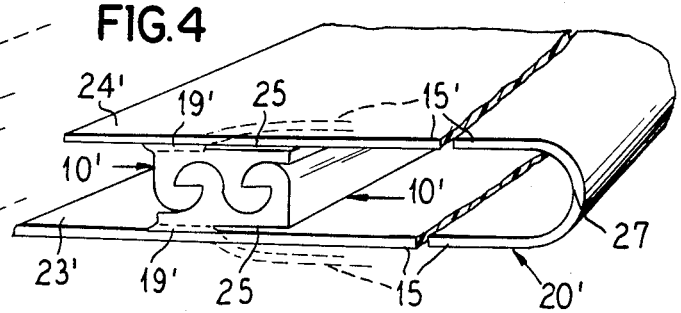
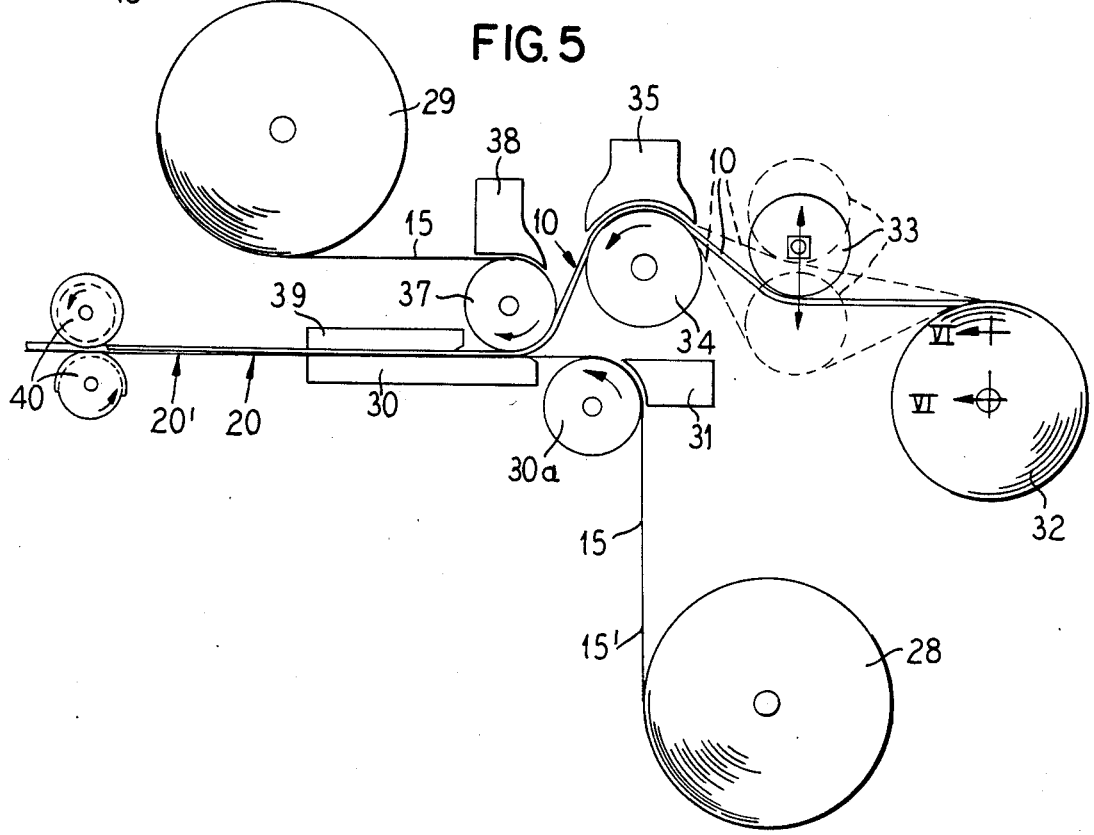

FUSIBLE RIB BONDING OF FASTENERS TO SUBSTRATE

BACKGROUND OF THE INVENTION

1. Field of the Invention

The present invention relates to the attachment of separable fasteners in strip form to substrates, and is particularly useful in the attachment of plastic profile separable fasteners to bag making film web or sheet material.

Various and sundry expedients have been employed in attaching separable fasteners (also sometimes referred to as reclosable fasteners) and in particular extruded plastic separable fasteners, to substrates such as, but not limited to, bag making film or sheet material. By way of example in the bag making art, the following U.S. patents are referred to:

U.S. Pat. No. Re. 26,991—Discloses the integral one piece extrusion of separable fastener means and bag wall film.

U.S. Pat. No. 4,279,677—Discloses applying freshly extruded fastener strip to prefabricated film which is preheated before receiving the extruded fastener strip which is still in a sufficiently fused state to adhere to the substrate.

U.S. Pat. No. 4,354,541—Discloses separable fasteners provided with ribs on the base as spacers to assure maintaining uniform layer of adhesive between the fastener base and a substrate. The ribs remain uneffected in the attached condition of the fastener.

U.S. Pat. No. 4,430,070—Discloses attachment of fusible fasteners to compatible fusible film by application of fusing heat through the film to the base of the fastener.

There are situations where none of the expedients in the foregoing listed patents will suit the purpose of attaching prefabricated fastener strip to prefabricated film or sheet material. For example, where the surfaces of the fastener strip and substrate are adaptable for fusion attachment, the substrate may sometimes not, without damage, be heated sufficiently to effect bonding with the fastener strip. The substrate may be of a type such as a laminate through which heat or other fusion energy may not be practically transferred. Where the film is of heavy gauge, it may not be practical to apply heat or other fusion energy means through the film without slowing the production process down, or distorting or weakening the film itself, even though the heavy gauge film and the fastener strip are fusibly compatible. In some instances the application of sufficient heat to seal the fastener strip-base to the substrate may cause damage to the fastener strip interlocking profiles located above the base.

SUMMARY OF THE INVENTION

An important object of the present invention is to provide a plastic separable fastener strip having new and improved means for attaching it to a substrate.

Another object of the invention is to provide new and improved fused attachment of plastic separable fastener strip to substrate while avoiding deleterious heat imposed damage or distortions in the fastener strip or substrate.

A further object of the invention is to provide a new and improved method of attaching plastic separable fastener strip to substrate.

BRIEF DESCRIPTION OF THE DRAWINGS

Other objects, features and advantages of the invention will be readily apparent from the following description of representative embodiments thereof, taken in conjunction with the accompanying drawing, although variations and modifications may be effected without departing from the spirit and scope of the novel concepts embodied in the disclosure and in which:

FIG. 1 is an isometric view of plastic separable fastener strip embodying the invention;

FIG. 2 is a fragmental isometric view showing the fastener strip structure of FIG. 1 attached to bag making substrate film or sheet material;

FIG. 3 is a view similar to FIG. 1 but showing a modification;

FIG. 4 is a view similar to FIG. 2 but embodying the modification of FIG. 3 in a slight modification of the bag material;

FIG. 5 is a schematic illustration of apparatus useful in a method of making the bag making material embodying the present invention;

DETAILED DESCRIPTION

Figure 6:
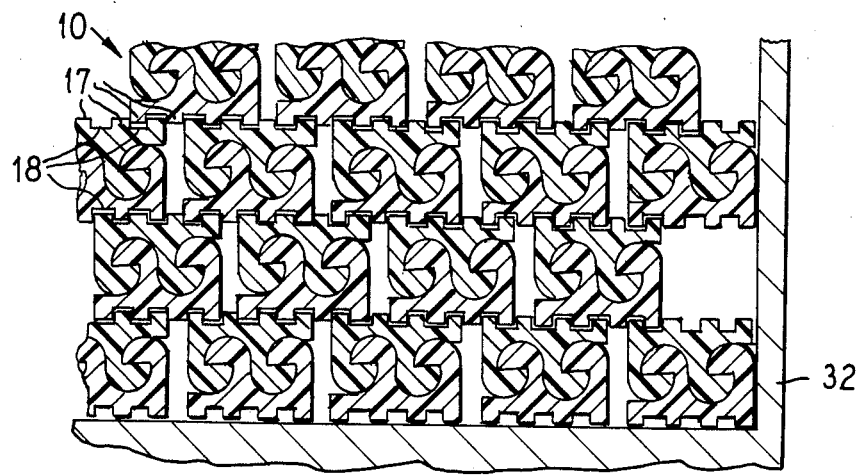
FIG. 6 is an enlarged fragmentary sectional detail view taken substantially along the line VI—VI in FIG. 5.

Referring to FIG. 1, plastic separable fastener strip 10, may be an extrusion formed from a suitable thermoplastic material such as polyethylene, polypropylene or ethylene acid copolymer (available as Surlyn, a Dupont trademark) depending upon the circumstances of its use. As shown, the fastener strip 10 is in a fully cured state. That is, the fastener strip 10 has been prefabricated and cured to its cold self-sustaining state. In the form shown, the fastener stip 10 is interlockably engagable with an identical companion strip.

The fastener strip 10 comprises a body 11, having a base surface 12 and oppositely projecting profile means in the form of spaced parallel generally hook-shaped resiliently flexible ribs 13 defining therebetween complementary groove formations 14 for separable interlockably receiving the profile ribs 13 of the companion and, in this instance, identical profiled plastic separable and reclosable fastener strip 10, in the manner shown.

New and improved means are provided for bonding the fastener strip 10 to a substrate 15, as shown in FIG. 2. For this purpose, the base 12 of the fastener strip is provided with a plurality of ribs 17 having spaces 18 therebetween. In this instance, four of the ribs 17 are depicted, but there may be more or less of such ribs, depending upon the size and possibly other characteristics of the fastener strip and the material from which it is made. In the illustrated instance, the ribs 17 are depicted as generally rectangular in cross section because that is an efficient form for extrusion, but it will be understood that other geometric cross sectional shapes may be provided if desired for any particular reason. In one preferred form, as shown, the ribs 17 may be about as wide as the spaces 18, and the height of the ribs may be slightly less than the width. A principal consideration in determining the mass versus spacing relationship of the ribs 17, is that the ribs can be fused without significant transfer of fusion temperature to the fastener strip body 11, and when fused the ribs 17 can be shaped into bonding layer 19 between the fastener strip and the substrate 15. For maximum bonding strength of the layer 19, the fused ribs 17 merge into a substantially continuous bonding layer between the base surface 12 and the substrate 15.

After the bonding, a telltale evidence of the manner of bonding may be noted along the edges of the fastener strips 10 (FIG. 2) by slight lateral flow of the material of the fused ribs 17 along the edges of the strips. Compare FIG. 2 with FIG. 1.

It will be understood, of course, that the surface of the substrate film or sheet 15 to which the fastener strip 10 is bonded by the fused layer 19, will be compatible with the material from which the fastener strip is made. For example, if the fastener strip 10 is made from polyethylene, the bonding surface of the substrate 15 should be polyethylene. If the fastener strip 10 is made from polypropylene, the bonding surface of the substrate 15 should be polypropylene. Although the substrate 15 may by a monofilament, it may also be a laminate, wherein the bonding surface comprises a layer which is fusibly compatible with the fastener strip 10.

In FIG. 2 the assembly provides bag making material 20 which comprises two substrate or bag wall sheets 15, each of which carries one of the fastener strips 10 in complementary mirror image relation, and located adjacent to free longitudinal edges of the bag wall sheets 15. At their opposite longitudinal edges the two bag sheets 15 may be, as shown, secured together as by means of a fusion seam 22. At their free edges, one of the sheets 15 provides a pull flange 23 which projects outwardly relative to the fastener strip 10 carried thereby. The other of the companion sheets 15 provides a pull flange 24, which projects outwardly relative to the fastener strip 10 bonded thereto. One of the pull flanges 23 and 24, in this instance the pull flange 24, is desirably shorter than the other to facilitate grasping when it is desired to open the fastener by pulling the complementary fastener strips 10 apart from the interlocked relation shown in FIG. 1 into the separated relation shown by way of illustration in FIG. 2.

In FIGS. 3 and 4, a slightly modified arrangement of the fusible ribs 17 is shown, the remaining structure of the fastener strips 10' being shown as the same as in FIG. 1. On the fastener 10', the fusible ribs 17 are located only along the margin of the base surface 12 which is adjacent to the side of the fastener strip 10' which will be at the outside of the mouth of the bags to be made from the bag making assembly 20'. As shown, two of the ribs 17 are located in the outer side area of the base surface 12, leaving the remainder of the base surface 12 as a free area 25 which will be located adjacent to the inner side of the eventual bag into which the assembly 21 will be fashioned by separation into bag sections. Thus, the free areas 25 premit one or both of the bag wall materials 15' to spread away hingedly from the free areas 25 of the fastener as shown in dash outline in FIG. 4. This provides for greater resistance to opening or separation of the fastener from inside of the bag as compared to the outer mouth end of the bag when the pull flanges 23' and 24' are manipulated. Nevertheless, the fastener strips 10, are thoroughly bonded to the bag wall material 15' by the bonding layer 19' by which the fastener strips 10' are attached to the bag wall material 15' by fusion of the ribs 17. Here, also, it will be noted on comparison of FIGS. 3 and 4 that a slight lateral flow displacement along the edges of the strips 10' gives telltale evidence of the rib fusion bonding of the fasteners to the substrate.

The bag making assembly 20' may have the film or sheet material 15' in one piece folded upon itself at a bag bottom integral closure fold 27, thereby providing opposite bag walls.

One form of apparatus and method for making the fastener strip and substrate, for either of the assemblies of fastener strip and substrate 20 or 20', are exemplified in connection with FIG. 5.

In making the assembly 20, according to one preferred embodiment, two rolls 28 and 29 of the film or sheet material 15 are provided, one below and one above a table 30. In this instance, the material 15 is fed from the lower roll 28 as a web over a guide roller 30a to the top plane of the table 30. As the web 15 advances over the roller 30, it may be preheated as by means of a surface heating device 31 such as may discharge heated air to the longitudinal surface area of the web which is to receive the fastener strip 10 so as to facilitate bonding of the fused ribs 17. Other web heating arrangements may include heating means directed between the juncture of the fastener strip and film or onto the film itself at the fastener strip base location. At the same time, prefabricated zipper strip 10 in the interlocked dual strip relationship disclosed in FIG. 1, is fed from a source, such as a supply roll or spool 32, past a guiding and tensioning roller 33 and then past rib fusing means such as a heated fusing roller 34 for fusing the ribs 17 on one of the fastener strips 10 and a fuser such as a hot air applicator 35 for fusing the ribs 17 on the companion zipper strip. Then the interlocked zipper strip 10 fastener assembly with the ribs 17 in fused condition is guided by a presser roll 37 onto the table 30 into bonding relation to the web 15 fed from the lower supply roll 28, and at the same time, the web 15 fed from the upper supply roll 29 is trained over and guided by the presser roll 37 into engagement with the base of the fastener strip 10 which, in the illustrated instance, faces upwardly as compared with the downwardly facing base of the companion fastener strip 10. A preheating device, such as an air heater 38 desirably perheats the fastener-receiving area of the web 15 fed from the supply roll 29, as this web advances on the periphery of the roll 37 to bonding joinder with the fastener strip.

It may be noted that the guide roller 33 may be adjustable for varying the peripheral contact with the heating roller 34 to attain optimum fusing effect with respect to the fusible ribs 17 having regard to various prevailing conditions at the time of operation of the system.

As the assembly 20 advances from the presser roll 37, it is engaged by an upper presser bar 39 which cooperates with the table 30 which may serve as a lower presser bar. This assures that the bonding layers 19 provided by the fused ribs 17 along the base surfaces 12 of the fastener strips 10 will be in thorough bonding relation to the base surfaces of the fastener strips and the surface of the adjacent substrate sheet 15 as the bonding layer sets.

Any or all of the several rollers and rolls may be driven in coordinated relation. For feeding the assembly 20 onward from the table 30, opposed driven feeding pinch rolls 40 may be provided. Downstream from the feed rolls 40 the assembly 20 may go directly to a bag making apparatus or to a bag making and filling apparatus, or the material may be rolled into supply rolls.

For producing the assembly 20', where the film or sheet material 15' is all in one piece, which is then folded upon itself, the same general apparatus and method exemplified in FIG. 5 may be employed. For this purpose, only the lower supply roll 28 will supply the sheet material 15' in open condition and in proper width. However, there will be two of the fastener strip supply rolls 32 each carring one of the mating fastener strip sections spaced axially from one another to the desired relative positions for supplying the zipper strips 10' to the proper longitudinal locations on the web provided by the sheet 15'. There will also be two of the preheaters 31 properly located to preheat the relatively narrow areas of the sheet 15' to receive the two fastener strips 10'. The guide roller 33 may be extended in length or into two parts to accommodate the two fastener strips 10'. Similarly, the heater roll 34 may be extended or may be in two parts for effecting fusion of the ribs 17 into the fusion bonding layers 19'. Also, the pressing and guide roll 37 may be extended to accommodate the spaced relation of the zipper strips 10'. Of course, the second sheet supply roll 29 and the preheater 38 will be omitted. The remainder of the processing apparatus will remain the same except for any slight modification to accommodate the assembly 20'.

Alternately one supply roll of interlocked zipper strip may be provided and the zipper strip will be separated into its two parts with each being guided into proper spaced parallel alignment relative to each other onto the open sheet material 15'.

If preferred, a device for supplying hot fusion air or other fusion energy may be employed instead of the direct contact heating roll 34. The principal consideration is that only the fusion ribs 17 be fused to provide the bonding layers 19 or 19'. The fusion and bonding should be effected without distorting or otherwise damaging the profiles of the zipper strips 10, 10' or the sheet material 15, 15'.

A desirable advantage attributible to the ribs 17 in their solid state is that during payoff from the supply roll or rolls 32, the ribs provide anti-sideslip means during the unwinding from the supply roll by interdigitation of the ribs as depicted in FIG. 6. This is particularly advantageous where the joined or interlocked zipper strips 10 (FIG. 1) are fed from a large size supply roll and wherein the anti-sideslip interengagement of the ribs 17 prevents lateral deflections that may result in slipping of the zipper strips between layers of wound strips thereby cousing entanglement of the strips, and interference with the processing to which the zipper strip assembly is subjected downstream from the payoff from the supply roll.

In FIG. 6 the interlocked arrangement of fastener strips 10 is depicted, and the interlocked fastener strips are shown as spirally wound in the spool 32 and with the ribs 17 of the windings interdigitated in engagement within the grooves 18. In this sort of winding, as the fastener strip is unwound from the spool and the winding tension is relaxed, the fastener strip may tend to fall in between windings of the strip and become entangled in the absence of the interdigitated ribs 17 which retain the strip windings against lateral displacement.

Figure 7:
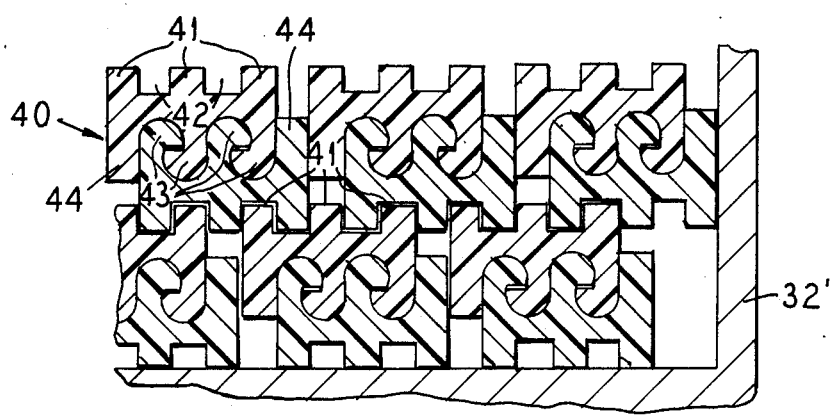
FIG. 7 is a fragmentary sectional detail view similar to FIG. 6 but showing a modified reclosable zipper or fastener assembly.

In FIG. 7, the fastener strips 40 have not only longitudinally extending ribs 41 along their back faces, with slightly wider longitudinal groove spaces 42 between the ribs, but the profiled sides of the fastener strips have, in addition to interhooked profiles 43, stabilizer flanges 44. In this form, also, the assembly of zipper strips, wound in spiral fashion in the spool 32' are retained against transverse or lateral displacement by virtue of the interdigitated engagement of the ribs 41 as permitted by the grooves 42.

Figure 8:
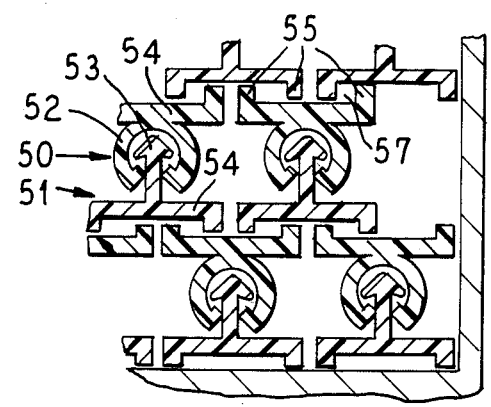
FIG. 8 is another similar fragmentary sectional detail view showing another modified reclosable fastener assembly.

FIG. 8 depicts zipper strips 50 and 51 of the type wherein generally groove shaped profile 52 in the strip 50 complementally separably and reclosably interlocks with a generally arrowhead shapeed rib 53 of the zipper strip 51. Respective base surface flanges 54 on the zipper or fastener strips 50 and 51 have ribs 55 which project away from the profiles of the respective strips and are fusible for the same purpose as described in connection with the fusible ribs 17. While the fusible ribs 55 are located along the opposite edges of the base flanges 54, with a substantial space 57 between the ribs 55, when the ribs 55 interdigitate substantially as shown, even though there may be more side play permitted, nevertheless the ribs 55 cooperate in retaining the spirally wound strip assembly against such lateral dispacement as would permit entanglement during payoff or unwinding of the strip assembly.

It will be understood that variations and modifications may be effected without departing from the spirit and scope of the novel concepts of the present invention.

I claim as my invention:

1. A method of attaching plastic separable fastener strip to a substrate which comprises:
   providing an extruded thermoplastic fastener strip having a base surface and profile means projecting on said strip opposite to said base surface for separably interlocking with complementary profile means on a companion fastener strip;
   providing on said base surface, and as an integral part of the extruded strip, ribs of substantially less mass than said profile means and relatively closely spaced from one another; and
   fusing said ribs into a bonding layer and thereby bonding said base surface to the substrate by subjecting said strip to heat in an amount to place said ribs in a fusible condition but not to deform said profile means owing to said different masses thereof.

2. A method of attaching plastic separable fastener strip to a substrate, according to claim 1, comprising pressing the strip with said fused ribs against the substrate and thereby spreading said layer and substantially filling in space between ribs and effecting said bonding.

3. A method of attaching plastic separable fastener strip to a substrate, according to claim 1, comprising forming said layer into an all-over bond of said base surface to the substrate.

4. A method of attaching plastic separable fastener strip to a substrate, according to claim 1, comprising limiting said layer to one longitudinal portion of said base surface, and leaving the remainder of the base surface free from said substrate.

5. A method of attaching plastic separable fastener strip to a substrate according to claim 1, comprising selecting said material of the strip from polyethylene, polypropylene or ethylene acid copolymer.

6. A method of attaching plastic separable fastener strip to a substrate, according to claim 1, which comprises paying off the strip to said substrate from a roll in which the strip is spirally wound, and in the roll interdigitating said ribs and thereby restraining the strip against undesirable lateral displacement in the roll.

7. A method for attaching an extruded plastic separable fastener strip to a substrate comprising the steps of:
feeding preformed substrate web to a bonding zone;
feeding a thermoplastic fastener strip to a heating zone preceding said bonding zone, said strip having a base surface provided with a plurality of fusible ribs and an opposite surface having projecting elements thereon, said ribs and said elements comprising integrally extruded parts of the strip and said ribs having substantially less mass than said elements;
subjecting said strip to heat in said heating zone in an amount for placing said ribs in a fusible condition while retaining said elements underformed owing to the different masses of said ribs and said elements; and
pressing the fastener strip against said web in said bonding zone with said base surface facing the web thereby squeezing the still fusibly conditioned ribs into a layer bonding said base surface to said web.

8. A method according to claim 7 comprising the additional step of forming said fastener strip by assembling two component fastener strips each of which has a base surface with fusible ribs thereon, wherein the step of subjecting said strip to heat is further defined by heating the ribs on both of said base surfaces into said fusible conditions, wherein the step of feeding said prefabricated web is further defined by feeding a separate web to each of said two component fastener strips in said bonding zone, and wherein, the step of pressing is further defined by pressing both of said webs toward the repsective base surfaces and forming said bonding layers of the fusibly conditioned ribs respectively between both of said webs and said fastener strip surfaces.

9. A method according to claim 7, wherein the step of pressing is further defined by initially pressing said web and fastener strip together using a first pressure source, and subsequently pressing said web and fastener strip together using a second pressure source for assuring thorough bonding of the fused layer between said base surface and said web.

10. A method according to claim 7, wherein the step of heating said fastener strip is further defined by running said fastener strip over a heated roller for fusibly heating said ribs.

11. A method according to claim 10 comprising the additional step of adjusting the peripheral extent of contact of said heated roll by said ribs in running over said roller.

12. A method according to claim 7, comprising the additional step of placing said heating zone for fusibly heating said ribs as close as practicable to where the fastener strip joins the web in said bonding zone.

* * * * *